USOO5657426A

United States Patent [19]
Waters et al.

[11] Patent Number: 5,657,426
[45] Date of Patent: Aug. 12, 1997

[54] METHOD AND APPARATUS FOR PRODUCING AUDIO-VISUAL SYNTHETIC SPEECH

[75] Inventors: Keith Waters, Watertown; Thomas M. Levergood, Bellingham, both of Mass.

[73] Assignee: Digital Equipment Corporation, Maynard, Mass.

[21] Appl. No.: 258,145

[22] Filed: Jun. 10, 1994

[51] Int. Cl.$^6$ ..................................................... G10L 3/00
[52] U.S. Cl. ........................................ 395/2.85; 395/2.79
[58] Field of Search ................................. 395/2.85, 2.74, 395/2.79

[56] References Cited

PUBLICATIONS

Morishima S, Aizawa K, Harashima H; An Intelligent Facial Image Coding Driven by Speech and Phoneme; ICASSP '89 Feb. 1989.

Waters K; A Musce Model for Animating Three Dimensional Facial Expression; ACM Computer Graphics vol. 21 No. 4 Apr. 1987.

K. Aizawa, H. Harashima, and T. Saito, "Model–Based Sysnthesis Image Coding (MBASIC) System for a Person's Face," In Signal Processing Image Communication, vol. 1, pp. 139–152, 1989.

I. Carlbom, W. Hsu, G. Klinker, R. Szeliski, K. Waters, M. Doyle, J. Gettys, K. Harris, T. Levergood, R. Palmer, M. Picart, D. Terzopoulos, D. Tonnesen, M. Vannier, and G. Wallace, "Modeling and Analysis of Empirical Data in Collaborative Environments," Communications of the ACM (CACM), 35(6):74–84, Jun. 1992.

H. Choi, S. Harashima, "Analysis and Synthesis of Facial Expression in Knowledge–Based Coding of Facial Image Sequences," In International Conference on Acoustics and Signal Processing, pp. 2737–2740, 1991.

N. Duffy, "Animation Using Image Samples," Processing Images of Faces, Ablex, New Jersey, pp. 179–201, 1992.

L. Hight, "Lip–Reader Trainer: A Computer Program for the Hearing Impaired," Proc. of the Johns Hopkins First National Search for Applications of Personal Computing to Aid the Handicapped, pp. 4–5, 1981.

J. Lewis and F. Parke, "Automatic Lip–Synch and Speech Synthesis for Character Animation," In CHI+CG '87, pp. 143–147, Toronto, 1987.

J. Moore and V. O'Connor, "Towards an Integrated Computer Package for Speech Therapy Training," Microtech Report, Bradford College of Art, 1986.

M. Oka, K. Tsutsui, A. Ohba, Y. Kurauchi, and T. Tago, "Real–Time Manipulation of Texture–Mapped Surface," Computer Graphics, 21(4):181–188, 1987.

F. Parke, "A Model of the Face that Allows Synchronized Speech," Journal of Computers and Graphics, 1(2):1–4, 1975.

(List continued on next page.)

*Primary Examiner*—Allen R. MacDonald
*Assistant Examiner*—Robert Sax
*Attorney, Agent, or Firm*—Ronald C. Hudgens; Clayton L. Satow

[57] ABSTRACT

A method and apparatus provide a video image of facial features synchronized with synthetic speech. Text input is transformed into a string of phonemes and timing data, which are transmitted to an image generation unit. At the same time, a string of synthetic speech samples is transmitted to an audio server. The audio server produces signals for an audio speaker, causing the audio signals to be continuously audibilized; additionally, the audio server initializes a timer. The image generation unit reads the timing data from the timer and, by consulting the phoneme and timing data, determines the position of the phoneme currently being audibilized. The image generation unit then calculates the facial configuration corresponding to the position in the string of phonemes, calculates the facial configuration, and causes the facial configuration to be displayed on a video device.

21 Claims, 7 Drawing Sheets

PUBLICATIONS

F. Parke, "Parameterized Models for Facial Animation," IEEE Computer Graphics and Applications, 2(9):61–68, 1982.

"Expression control using synthetic speech." —Wyvill, et al, Department of Computer Science, University of Calgary, Calgary, Alberta, Canada, T2N 1N4, ACM Siggraph '89 Course Notes, State Of The Art In Facial Animation, 16th Annual Conf. On Computer Graphics And Interactive Techniques, Boston, Massachusetts 31 Jul.–4 Aug. 1989, pp. 163–175.

"Animating speech: an automated approach using speech synthesised by rules" —Hill, et al, The Visual Computer (1988) ACM Siggraph '89 Course Notes, State Of The Art In Facial Animation, 16th Annual Conf. On Computer Graphics And Interactive Techniques, Boston, Massachusetts 31 Jul.–4 Aug. 1989, pp. 176–188.

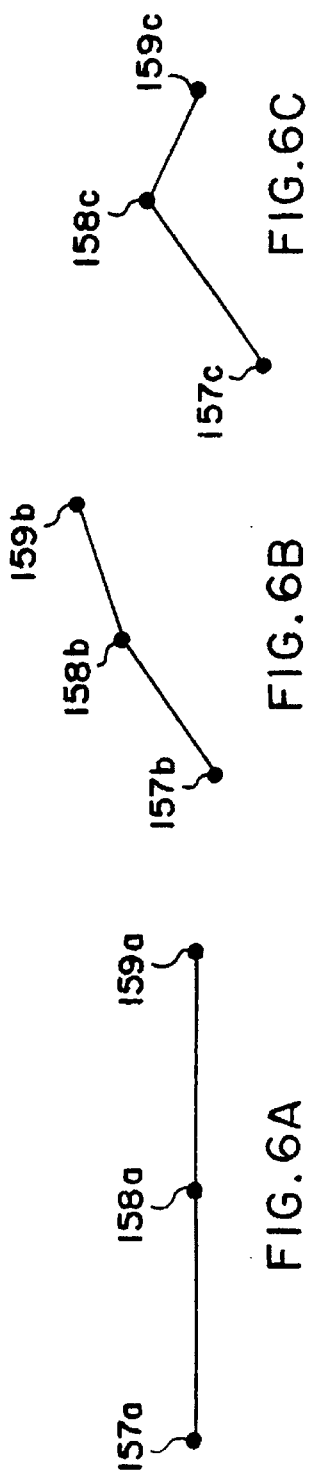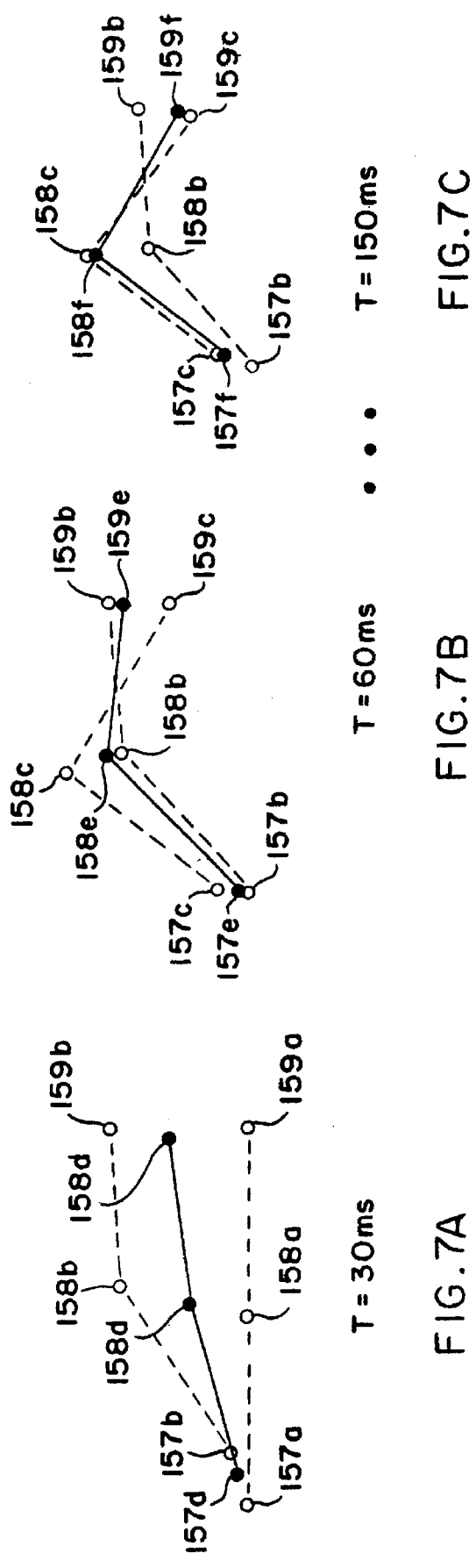

METHOD AND APPARATUS FOR PRODUCING AUDIO-VISUAL SYNTHETIC SPEECH

FIELD OF THE INVENTION

This invention relates generally to the field of real-time synthetic production of audio-visual speech by a computer system, and more particularly to real-time generation of a video portion of synthetic speech corresponding with an audio portion.

BACKGROUND OF THE INVENTION

Speech which is synthetically produced by a machine, such as a computer, is useful for transforming written text into audible speech, for uses such as for automated reading to a person who is unable to read, or for automated phone answering systems.

For some applications, it may be desirable to add a dynamic visual image, such as a facial image on a display device, to the audible speech, such that the facial image appears to be speaking. Such an image would be particularly useful in a speech reading and learning device, especially where mouth posture is important, such as teaching hearing impaired individuals to lip read. Other uses could be in computer interfaces, animation, audio-visual presentations, or interactive kiosks (such as automated bank tellers, ticket booths, automated flight planners, information booths in hotel or office buildings and the like).

An important problem that is encountered when adding a facial image to the audible speech is to make the audio-visual speech realistic. Creating a realistic appearance requires synchronizing the video portion of the speech particularly the mouth and lips of a facial image, with the sound. One conventional method for synchronizing the video and audio portions of the synthetic speech is the "frame by frame" technique described below.

Unfortunately, the frame-by-frame method has limited usefulness for real time applications. Even with a very powerful computer, the frame-by-frame method can only produce simple, crude face configurations which lack detail in the facial expression. Additionally, in a real time system, events may cause the audio and the video portions of the synthetic speech to become unsynchronized. The lack of synchronization between the audio and the video portions may increase with time and if not corrected, the lack of synchronization may become very noticeable and annoying. Conventional audio-visual speech systems lack the ability to resynchronize in real time, sometimes called "adaptive synchronization."

SUMMARY OF THE INVENTION

An audio-visual synthetic speech system constructed according to the principles of the invention overcomes the aforementioned and other problems of conventional audio-visual synthetic speech systems by providing for the synchronizing of the video portion and the audio of the synthetic speech every time a facial image is generated, even if the video portion is generated at irregular and unpredictable intervals. The processing of the audio portion of the synthetic speech proceeds continuously, to avoid annoying pauses in the speech. While the audio portion proceeds, the system keeps track of an elemental speech unit currently being processed. When an image generation unit of the synthetic speech system is available to generate a facial configuration, the image generation unit generates a facial configuration corresponding to the elemental speech unit currently being processed by the audio portion of the system.

Keeping track of an elemental speech unit that is currently being processed and generating the corresponding facial configuration allows the synthetic speech system to resynchronize the video portion of the synthetic speech with the audio portion of the synthetic speech without requiring generation of the video portion at regular intervals. Additionally, an audio-visual synthetic speech system constructed according to the principles of the invention is capable of real time "adaptive synchronization", that is resynchronizing at any time the audio and video portions if they become unsynchronized. In one particular aspect of the invention, a method for producing synthetic speech from speech text input includes the steps of converting the speech text input to a series of elemental speech units, continuously transforming the series of elemental speech unit to audio signals, and generating a sequence of facial configurations corresponding to the series of elemental speech units. The facial configurations of the sequence are generated at irregular intervals determined by the amount of time required to generate each successive facial configuration, and the facial configurations of the sequence are determined by the elemental speech unit being transformed upon the completion of the generating of a previous facial configuration.

In another aspect of the invention, speech text input is converted to a series of elemental speech units, which are continuously transformed to audio signals, facial configurations are repeatedly generated for display on an output device. The facial configurations are determined by the audio signal currently being transformed, and thus by the time required for generating the previous facial configuration.

The field of text-to-speech conversion, conventional audio-visual synthetic speech system, and the invention are described in more detail in the detailed description of the invention section, which refers to the following drawings, in which like number refer to like components in the several figures.

BRIEF DESCRIPTION OF THE DRAWINGS

FIGS. 6A, 6B, and 6C are hypothetical visemes corresponding to the "F" "RR" and "S" phonemes, respectively; and FIGS. 7A, 7B, and 7C each show three points in a hypothetical lip and mouth configuration on an image generated by a system built according to the principles of the invention.

DETAILED DESCRIPTION OF A PREFERRED EMBODIMENT

Synthetic Audio-Visual Speech

Prior to describing the invention, a brief discussion of synthetic audio-visual speech will be given, which will be useful in understanding the invention.

Typically, synthetic speech is created by a speech synthesizer from text input in the form of digitally encoded text. One popular format for digitally encoding text is the American Standard Code for Information Interchange (ASCII). To create synthetic speech from text input, the synthetic speech system must first decode the text into a form that can converted to audible speech. This is conveniently done by converting the text into a sequence of elemental linguistic speech sound units corresponding to the text.

The elemental speech units are generally different from letters. In English and many other languages, a given letter may have many different sounds; for example, the letter "g" in the word "gag" has a different sound than the letter "g" in "giraffe". Also, two different letters may be pronounced the same (for example the "g" in "giraffe" and the "j" in "judge"). Additionally, a letter may have a different sound depending on the letter preceding or succeeding it; in fact a combination of letters may have a sound that is different from that of any one of the letters has by itself. For example, the "ch" combination has a sound unlike either the "c" or the "h" have by themselves or in combination with any other letter. Therefore, linguists break speech down into linguistic speech sound units, frequently referred to as phonemes. In English, the "g" as in "giraffe" or "judge" may be a phoneme, while the "g" as "gag" may be another phoneme. Additionally, for some applications, no sound, that is a pause in speech, may be considered a phoneme. There is no universally accepted set of .phonemes, because the number of phonemes depends somewhat on whether a minor difference in a sound is considered a distinct phoneme.

Each of the phonemes has a characteristic sound and a corresponding acoustic waveform. When the waveform is reproduced by an audio system, the phoneme is audibilized. The characteristic waveforms of the phonemes have differing durations. For example, for normal speech at 165 words per minute, the waveform for the "t" phoneme lasts 51 milliseconds, while the "yu" phoneme lasts 186 milliseconds.

Decoding text into phonemes and audibilizing the phonemes is a difficult process, particularly for English, but several systems for decoding text input into audible speech have been developed. An example is the DECtalk system, produced and sold by the Digital Equipment Corporation of Maynard, Mass.

In addition to producing audible speech, an audio-visual synthetic speech system must be able to produce a visual component also. One method of doing this is to display a dynamic facial image that makes facial movements, particularly with the mouth and lips, that are similar to the facial gestures a real person might make.

Figure 1A:
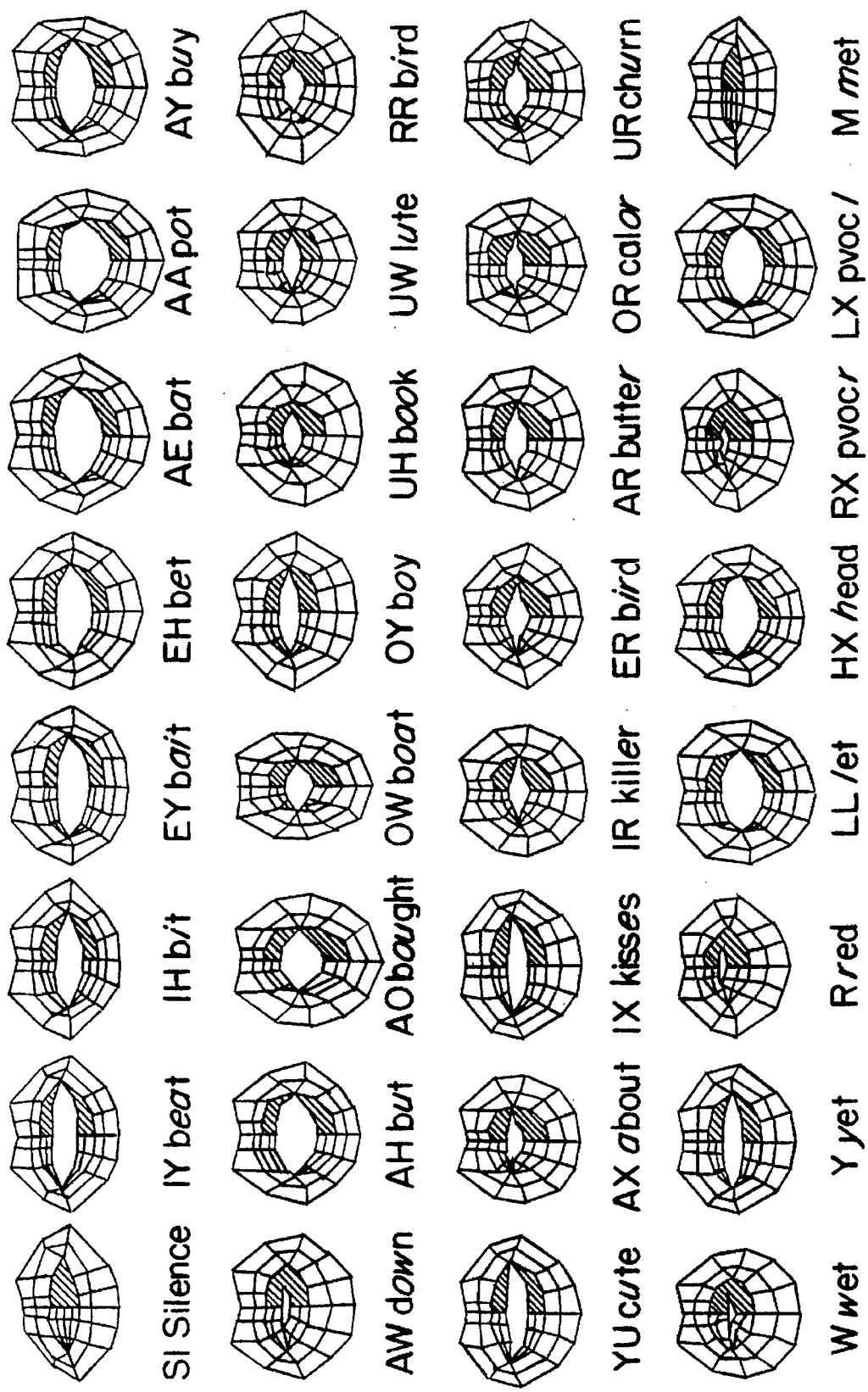
FIGS. 1A and 1B, hereinafter collectively referred to as FIG. 1, show an exemplary set of phonemes and corresponding visemes.
Figure 1B:
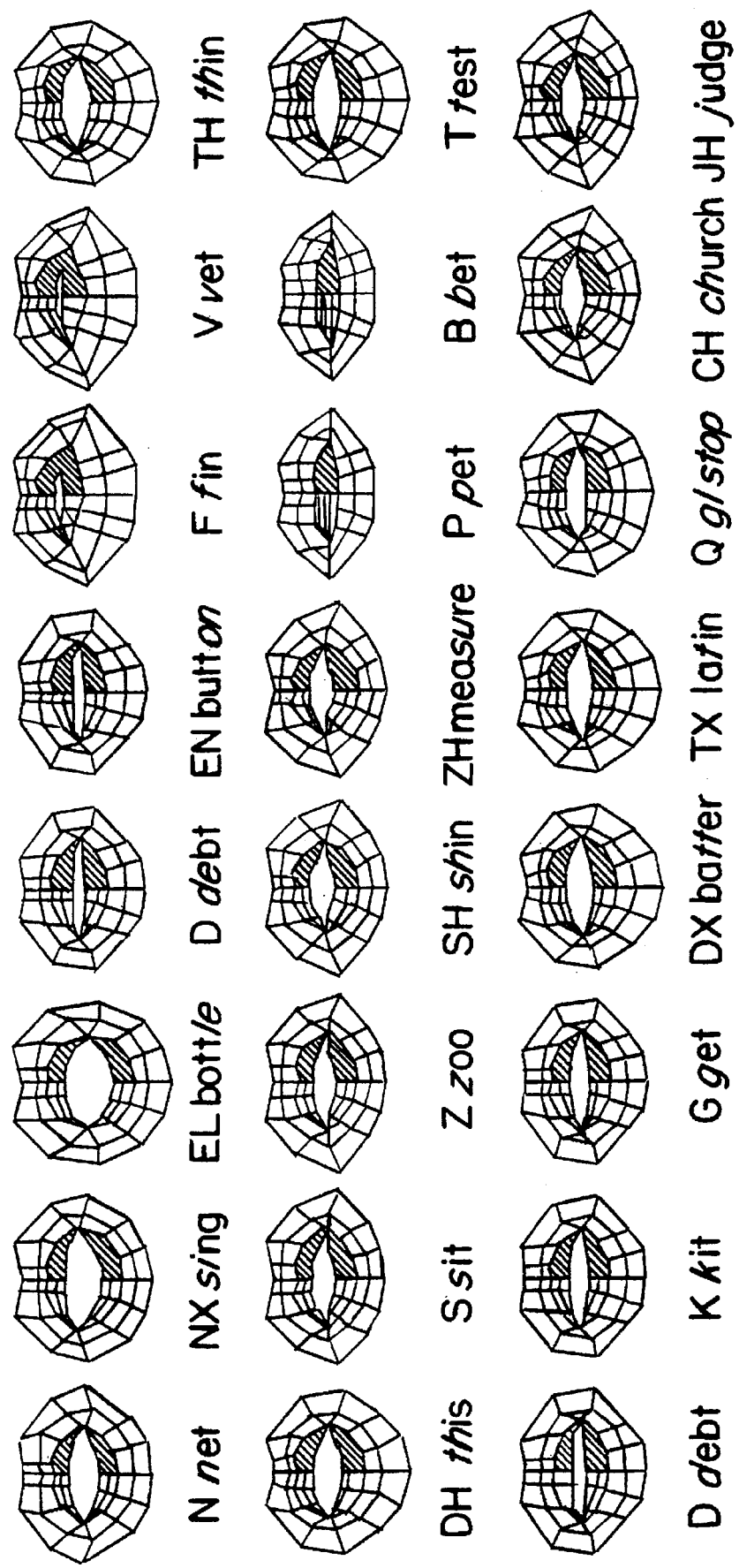

During the audibilizing of a phoneme, the mouth and lips form a characteristic visible configuration called a viseme. Some distinct visemes are very similar (for example the viseme for "sh" sound as in shin is almost identical to the viseme for the "s" sound as in sin). For applications such as synthetic speech, a human mouth is modeled, and the position of various points on the mouth are observed. The points may then be connected and the resulting geometric figures mapped and recorded in a computer data base. An exemplary set of 55 visemes and corresponding phonemes is shown in FIG. 1, as will be described in more detail below.

While a viseme is formed at some point during the audibilizing of a corresponding phoneme, the mouth and lips do not remain in the viseme position for the entire duration during which the phoneme is sounded. For a part of the duration, the points on the mouth and lips are moving from the viseme corresponding to the phoneme previously sounded to the viseme corresponding to the phoneme currently being sounded. For another part of the duration, the points on the lips and mouth are moving from the phoneme currently being sounded to the viseme corresponding to the next phoneme that will be sounded. Of course in very rapid speech, the phonemes take less time to audibilize than in less rapid speech, the mouth and lips do not remain in the viseme position as long, and the points on the lips and mouth move more rapidly from one viseme to the next. In very rapid speech, the viseme may never form distinctly.

Achieving realistic audio visual synthetic speech requires maintaining synchronization between the audio and visual portions of the synthetic speech. This involves causing a characteristic facial configuration to appear on the screen at the same time that a phoneme is audibilized by the sound system. Achieving more realistic appearing speech also requires lifelike movement of the lips and mouth as they move from one viseme to the next.

Frame by Frame Synthetic Speech

In a frame-by-frame audio-visual synthetic speech system, the audio portion of the synthetic speech is generated and recorded on a storage medium, such as magnetic tape or the sound track of motion picture film. The video image at regular time intervals is generated and recorded on a storage medium, such as video tape or the video frames of motion picture film. After the video and audio portions are created, they are then combined. Sychronicity between the audio and video portions can be achieved because video image is generated at regular, and therefore predictable, intervals.

The regular time interval represented by each frame depends on the medium for which the synthetic speech is intended. For example, in a typical video presentation played back on a video terminal (such as a television set or video monitor) the image on the screen may be replaced ("refreshed") 30 times per second in order to reduce annoying "flicker". In such a system, each frame would represent ⅓₀second (33.3 milliseconds).

Unfortunately, simply generating the viseme that corresponds to a phoneme being sounded during a frame does not produce realistic appearing audio-visual speech. There may be no phonemes or more than one phoneme sounded in a single frame, or the appropriate position of the lips and mouth may be in between two visemes. To make the audio-visual speech appear more realistic, some frame-by-frame synthetic speech systems sample facial positions at short intervals (such as 2 milliseconds) and interpolate between the positions to produce a "blended" facial position for that frame.

A frame-by-frame system may be able to approach real time performance—that is, to generate the audio portion such that it can be audibilized at normal conversational speed, and to generate the video image at about the same rate as the audio portion is produced—if the sampling, the interpolation and the production of the blended facial positions frames are performed by a very fast processor.

However, even with very fast processors, real time frame-by-frame system still have many disadvantages. A considerable portion of the computing capability of the processor is used to do the sampling and the interpolation. The portion of the computing capacity that can be used for controlling facial parameters that can be controlled is therefore limited, and therefore a real time frame-by-frame system is useful for relatively crude faces (such as cartoons) only. Increasing the number of facial parameters (such as jaw rotation, mouth width, x, y, and z position of the corners of the mouth) is a complex task that not only requires more computing capacity, but also increases the complexity of the sampling and interpolation steps. Adding other features that create a more lifelike appearance—particularly features such as eye blinking, or manipulating the eyebrows—that are not directly related to the viseme currently being sounded may be difficult.

If the complexity of the face were to change (for example changing from a cartoon face to a human face), or if the rate of speech were increased, or if sophisticated features (such as allowing the head to turn, or the eyes to blink, or the face to assume configurations characteristic of anger, happiness or the like) the processor may not be able to generate a facial configuration in the requisite length of time (33.3 milliseconds in the above example). Achieving synchronicity may require less frequent sampling, resulting in less realistic appearing speech. This is particularly troubling, because studies have shown that as realism increases, problems such as lack of synchronicity between the audio and video become more annoying to the perceiver.

Additionally, if some event, such as a system interrupt or the unavailability of a bus were to cause the system to be unable to display the facial configuration in the requisite length of time, the video and audio portions of the synthetic speech would become unsynchronized, or the sounding of the audio portion may have to be stopped, which would result in an annoying pause.

Figure 2:
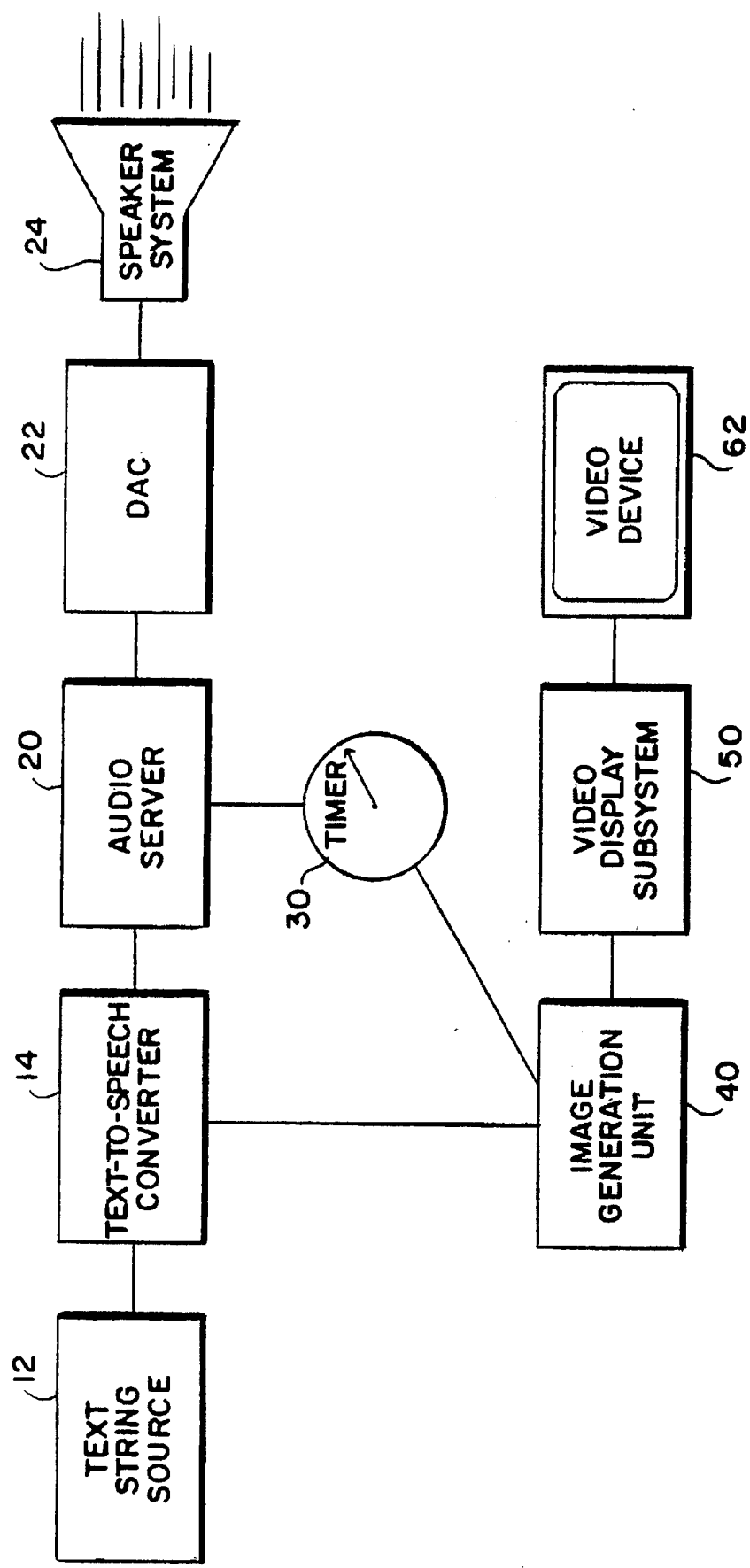
FIG. 2 is a block diagram of a synthetic speech system according to the principles of the invention.

An audio-visual synthetic speech system incorporating the invention, such as that shown in FIG. 2, overcomes these and other problems of conventional systems.

The system described may use a text source as input and an audio system and video device as output, but other forms of input and other forms of output (such as outputting to video tape or to a communication device) are possible. Additionally, the system described is a real-time system for producing synthetic speech in which the audio portion is audibilized over an audio system and the video portion is generated on a video device, such as a monitor. Those skilled in the art will recognize that with simple modifications, such as outputting the audio and video portions to a magnetic recorder or communications network, the system could be used for other types of applications, such as creating animated presentations.

FIG. 2 is a block diagram of a synthetic speech system according to the principles of the invention. A text string source 12 which provides text input is connected to a text-to-speech converter 14, which converts the text input to data as will be described later. The text-to-speech converter is in turn connected to an audio server 20, which receives the output of the text to speech converter and outputs signals which can be converted by an attached digital-to-analog converter (DAC) to analog signals. The audio signals can in turn be broadcast over an attached speaker system 24.

Also connected to the text-speech-converter 14 is an image generation unit 40. The image generation unit creates facial images according to a process described below that can be converted by an attached video display subsystem 50 that can be displayed on a video device 62.

Connected to the audio server 20 and the image generation unit 40 is a timer 30.

The text string source 12 may provide digitally encoded text input to a text-to-speech converter 14. The text string source may take many forms, such as a keyboard, a computer file transmitted over a communications network, a speech-to-text converter, an optical character recognition device, or one of many other such devices which are capable of producing a continuous stream of text. The text-to-speech converter 14 accepts the digitally encoded text input, parses the text into a string of phonemes, and converts the string of phonemes to data that can be converted to sound signals by an audio system and which can be used to generate facial configurations by a video system.

The specific form of the data depend on the needs of the devices to which the data is sent. For example data output to the image generation unit 40 which generates the facial configuration, as will be described shortly, may be in the form of a digitally encoded string of phonemes and numbers, the numbers representing the length of time it takes the phoneme to be audibilized. Data from the text-to-speech converter output to an audio server 20 may be in the form of a stream digitally encoded audio waveforms corresponding to the string of phonemes.

The text-to-speech converter may be a commercially available device such as the previously mentioned DECtalk system available from Digital Equipment Corporation of Maynard, Mass.

The audio server 20 may include a microprocessor and system software for supporting an audio device. It receives the data from the text-to-speech converter and outputs signals which can be converted by the DAC 22 into analog signals that can be audibilized by the speaker 24.

The timer 30 records the time elapsed from a base time to provide a time reference for synchronization. The timer may be a simple timing device, may be responsive to the system clock, and may even be the system clock itself. Any arbitrary event could be used as a base time by the timer. In a preferred embodiment, it uses as the base time the time at which the first sample of speech is input to the audio server 20. If a string of text has been processed such that the phonemes have been processed and the image generation unit has generated an "at rest" position, the next string of text input may cause the timer to be reset to zero to begin a new synchronization time interval.

The image generation unit 40 receives data representing the string of phonemes and time intervals from the text-to-speech converter 14 and generates the appropriate face configuration for the phonemes, in a manner described below in connection with FIG. 3. The face configurations, which may be in the form of bitmap data, are received by the video display subsystem 50, which converts the data to video signals which are displayed on a video device 62.

Figure 3:
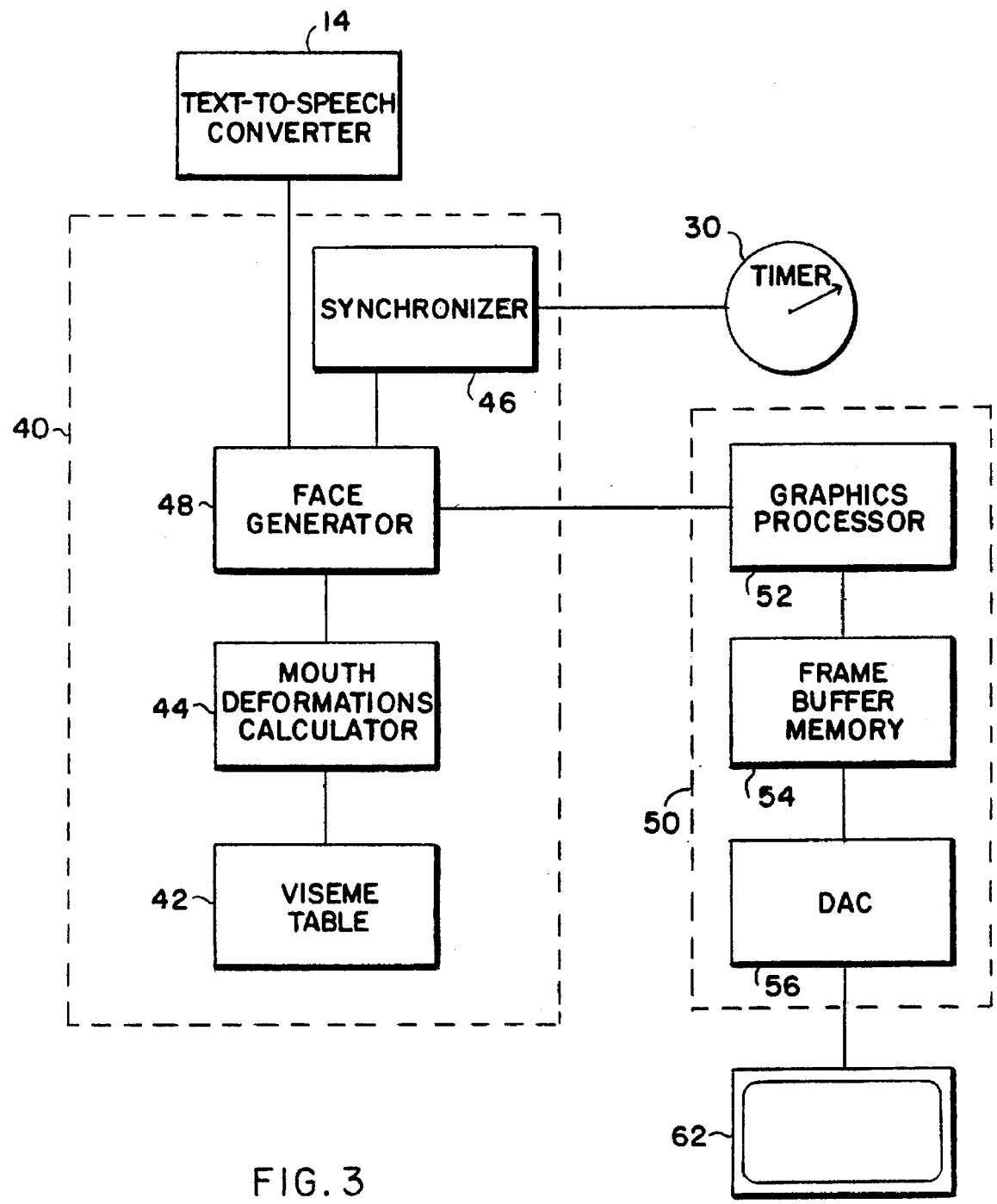
FIG. 3 is a block diagram of an image generation unit of the synthetic speech system of FIG. 2, shown in greater detail.

FIG. 3 shows the image generation unit 40 and the video display subsystem 50 in more detail. As shown the image generation unit may include four subunits; these subunits are a viseme table 42, a mouth deformations calculator 44, a synchronizer 46, and a face generator 48.

The viseme table 42 includes a database of phonemes and the visemes that correspond to the phonemes. The visemes may be stored as graphical representations of the visemes, such as bit maps, or may be of some other form, such as a database of nodes representing a wire frame model from which the graphical representations can be formed. The phonemes may be stored in the same digitally encoded form as the phoneme portion of the data received by image generation unit from the text-to-speech converter.

The synchronizer 46 which may include a microprocessor and associated memory and communications connections reads the elapsed time from the timer 30 and transmits the elapsed time to the face generator 48.

The face generator determines the facial expression corresponding to the phoneme being currently audibilized at the time indicated by the elapsed time, and transmits the graphical information to the video display subsystem 50 for display on the video device 62. The face generator may also include a microprocessor which, together with associated software programs, memory and communications connections, is capable of generating a predetermined facial expression corresponding to a predetermined set of phonemes.

In one embodiment of the system, such as for producing a talking cartoon character in which close synchronization between the mouth position and the sound is not required, the face generator 48 may generate the facial expression simply by reading a viseme from the viseme table and causing that viseme to be displayed on the video device. For example, if the phoneme currently being audibilized is the "AX" phoneme, the face generator may retrieve the data representing the viseme corresponding the "AX" phoneme and causing that viseme to be displayed on the video device. However, in a more sophisticated embodiment such as a highly detailed human face speaking with precise mouth positions, the face generator may use calculations produced by an element such as the mouth deformations calculator 44 to provide even greater realism by determining, by interpolation, intermediate configurations of the lips and mouth as they move from one viseme to the next. Thus, if the elapsed time does not fall at a time at which the lips and mouth are in an exact viseme position, the mouth deformations calculator calculates a lips and mouth configuration that is between two visemes, as will be explained below.

The mouth deformations calculator may include a microprocessor which, with associated memory, software, and communications connections, is capable of retrieving data from storage and performing mathematical calculations that will be described below.

Where still greater realism is desired, the mouth deformations calculator 44 can be adapted to take into account that the various points of the lips and mouth do not move linearly with respect to time. Stated differently, in moving from one point to another, the points of the lips and mouth do not move with a constant velocity, but rather accelerate and decelerate.

One method for taking the non-linear motion into account is to interpolate the position of the points on the mouth and lips using a non-linear function, such as a cosine function, to modify the displacement of the various points on the lips and mouth. For example, if the set of points $s_0$ (representing a first viseme) transforms to a set of points $s$ (representing a second viseme) an interpolated set of points $s'$ can be calculated using the formula $$s' = \left( (s - s_0) * \frac{1 - \cos(\pi t)}{2} \right) + s_0$$

where t is a linear transformation $0 \leq t \leq 1$ and the "*" means multiply.

A still more realistic representation of the lips and mouth position can be achieved if the mouth deformations calculator 44 is adapted to take into account that real movement of the mouth and lips is a dynamic processor not a series of discrete events. If the mouth deformations calculator is adapted to take into account dynamic factors such as mass, velocity, and acceleration, the mouth deformations calculator will be able to calculate lip and mouth positions that do not necessarily correspond to a specific viseme. Thus, the mouth deformations calculator is able to take into account the fact that the lip and mouth positions for a phoneme may not always correspond to the corresponding viseme, but may differ depending on the phonemes preceding and succeeding the phoneme being audibilized. It may also take into account the fact that a viseme may not be completely formed, particularly at a very rapid rate of speech. For example, the mouth deformations calculator may use Newtonian laws of motion:

where $x_i$ is the distance moved by point i, $v_i$ is the velocity $$\frac{dx_i}{dt} = v_i$$

$$m \frac{dv_i}{dt} = f_i - \gamma v_i$$

of point i, $f_i$ is the force applied to point i, and $\gamma$ is a velocity dependent damping coefficient. The force $f_i$ can be modeled by a Hookean elastic model, thus $$f_i = s_p * r_k$$

where $r_k$ is the distance which the between the position of point x in the previous viseme and the position of point x in the current viseme. Integrating equations of motion with respect to time yields for the velocity v and the position x:

$$v_i = v_i^0 + \frac{f_i}{m_i} \Delta t$$

$$x_i = x_i^0 + v_i \Delta t$$

The system may achieve even more realistic facial positions if a component of the system such as the face generator 48 can manipulate other facial features, such as to cause the eyes to blink, or to control other facial features such as the eyebrow, eyelids. The control of other facial features may be in reaction to the text string (for example, forming an eyebrow position characteristic of a question when a question mark appears in the text string); the control of other facial features may include periodic manipulation of facial features in a manner not related to the text string (such as adding realism by including periodic blinking of the eye), or may be in response to other instructions (such as manipulating the face to appear happy, fearful, angry, disgusted, surprised, and the like) not periodic and not related to the text string.

The video display subsystem 50 may include components which enable the images generated by the image generation unit 40 to be displayed on the video device. The components may include a graphics processor 52, a frame buffer memory 54 and a digital-to-analog converter (DAC) 56. The graphics processor is a microprocessor with associated software which generates a bitmap containing data such as color and intensity of the pixels on the video device, and stores the bitmap in the frame buffer memory 54. The frame buffer memory is a special purpose dual ported memory that has memory locations which correspond to pixels on the video device. The DAC 56 converts the digital information stored in the frame buffer memories to analog signals which can be used by the video device 62.

It is to be understood that FIGS. 2 and 3 show the functional interrelationship of the elements, and do not necessarily show a physical relationship. Furthermore, the elements of FIGS. 2 and 3 are not necessarily distinct devices. For example, the microprocessors of the audio server 20, the synchronizer 46, the face generator 48, the mouth deformations calculator 44, and the video display subsystem 50 may not be distinct microprocessors; instead, one or more microprocessors may be used to perform different tasks.

Figure 4:
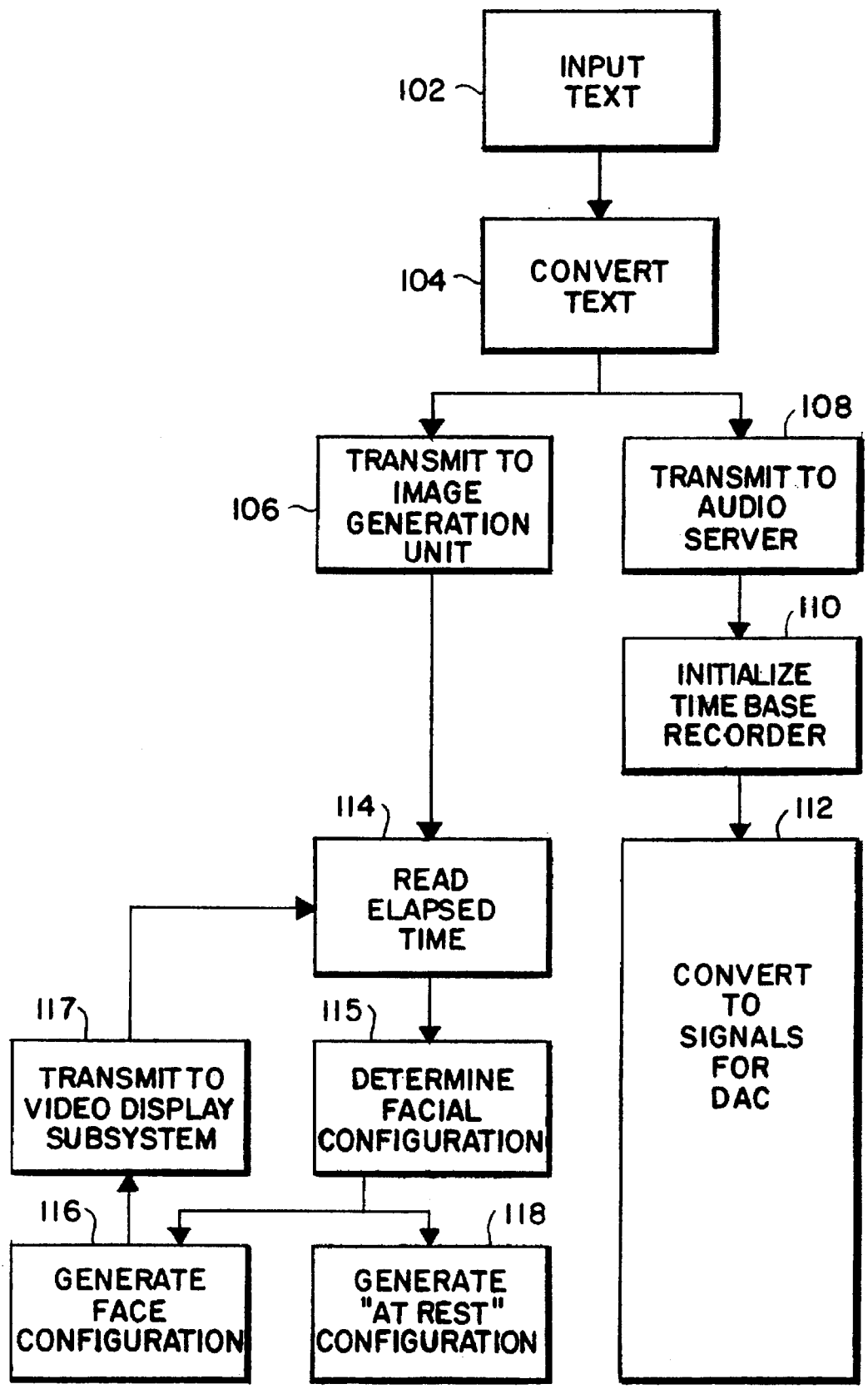
FIG. 4 is a flow diagram illustrating the operation of the synthetic speech system of FIG. 2.

FIG. 4 shows a method for the production of synthetic real-time synthetic audio-visual speech produced by a system such as shown in FIG. 2.

The text string source 12 inputs at 102 text to the text-to-speech converter 14. The text-to-speech converter converts at 104 the text to data representing string of phonemes and interval data corresponding to time intervals and transmits at 106 data including a string of digitally encoded phonemes and numbers, a first sequence of numbers representing the length of time it takes each of the string of phonemes to be audibilized, and a second group of numbers representing a running total of the first string of numbers, that is the total elapsed time of the to the image generation unit 40. At the same time, the text-to-speech converter 14 outputs at 108 the string of phonemes and interval data, in the form a string of digitally encoded acoustic waveforms, to the audio server 20, and the audio server initializes at 110 the global time base generator 30.

The audio server converts at 112 the string of digitally encoded waveforms into signals for the DAC. The converting proceeds continuously, to avoid annoying discontinuities in the audio portion of the synthetic speech.

The image generation unit begins receiving data transmitted in step 106. When the image generation unit begins receiving data, it reads at 114 the elapsed time on the timer to determine the elapsed time since the start of speech output and uses the elapsed time to determine at 115 an appropriate facial configuration. In one embodiment, the image generation unit determines an appropriate facial configuration by comparing the elapsed time read at step 114 with the data transmitted at 106 to determine the phoneme that is currently being processed (that is, the phoneme that is currently being converted to sound by the audio server 20 and the DAC 22). If no phoneme is currently being processed, the image generation unit generates at 118 an "at rest" face configuration. If a phoneme is currently being processed, the image generation unit generates at 116 a face configuration by retrieving the viseme corresponding to that phoneme, and transmitting at 117 the data to the video display subsystem 50. When the face configuration data has been transmitted to the video display subsystem, the image generation unit reads the elapsed time on the timer, and steps 114–117 are repeated until it is determined in step 115 that no phoneme is being processed, and the "at rest" face configuration is formed in step 118.

By repeating steps 114–117, the system continuously generates face configurations as fast as possible. In addition, the system adaptively synchronizes the video portion of the synthetic speech with the audio portion time every the face configuration is calculated by reading the elapsed time at step 114 and determining the phoneme currently being processed at step 115. Regardless of events that may cause the video and portions of the synthetic speech to become temporarily unsynchronized, the video and audio portions of the synthetic speech are resynchronized every time a new face configuration is generated, and the resynchronization takes place without requiring the system to pause.

In another embodiment of the invention, the determination step 115 includes an interpolation step. If a comparison of the elapsed time read at 114 with the data transmitted at 106 indicates that the mouth and lips are not at a viseme position, but rather are transforming from one viseme to another, the image generation unit calculates an interpolated position according an interpolation formula, examples of which have been given above. This will be better understood in the example discussed below.

The method described in the discussion of FIG. 4 can be better understood using a hypothetical example of the production of synthetic speech from the input text string "FIRST, A FEW PRACTICE QUESTIONS". In the conversion step (104 of FIG. 4) the text string is parsed and transformed into a string of phonemes, time duration of the waveforms representing the phonemes, and an accumulated time from the beginning of the waveform corresponding to the first phoneme. In this example, the phonemes are

F RR S T AX F YU P R AE K T IX S K W EH S CH IX N Z (from the phonemes shown in FIG. 1). The waveform representing the "F" phoneme has a duration of 58 milliseconds; the "RR" phoneme has a waveform lasting 109 milliseconds and which ends 167 milliseconds from the beginning of the first waveform.

Figure 5:
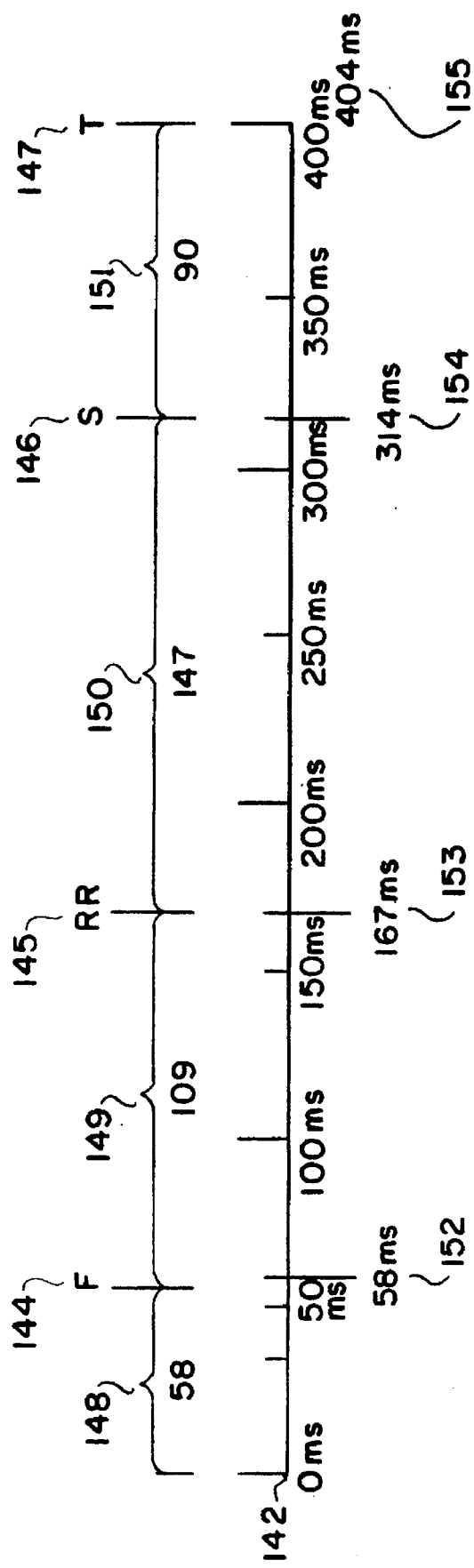
FIG. 5 is a time line illustrating data transmitted to an image generation unit from a text-to-speech converter.

The string of phonemes and interval data is then transmitted (step 106 of FIG. 4) to the image generation unit. A portion of the data, in time line form is shown in FIG. 5. In FIG. 5, the time scale 142 indicates the time from the base time, in milliseconds. As stated above, any arbitrary time can be used as the base time. In this case the time at which the first sample of speech is input to the audio server 20 of FIG. 2. The phonemes 144–147 are the first four of the phonemes resulting from the parsing of the text input "first, a few practice question." The time intervals 148–151 represent the length of time in milliseconds it takes the phonemes to be audibilized. As can be seen in FIG. 5, it takes 58 milliseconds (148) for the "F" phoneme to be audibilized; it takes 109 milliseconds (149) for the "RR" phoneme to be audibilized; 147 milliseconds (150) for the "S" phoneme to be audibilized; and 90 milliseconds (151) for the "T" phoneme to be audibilized. The elapsed times 152–155 are the elapsed times from the base time. The "F" phoneme is audibilized 58 milliseconds (152) from the base time; the "RR" phoneme 167 milliseconds (153) from the base time; the phoneme 314 milliseconds (154) from the base time; and the "T" phoneme 404 milliseconds (155) from the base time.

Examples of the formation of visemes are shown in FIGS. 6A–6C and 7A–7C. FIG. 6A shows three hypothetical points 157a–159a of a mouth and lips in an "at rest" configuration, that is when no sound is being audibilized. In the example that follows, it is assumed that prior to input of the text String "First a few practice questions", there was no text being converted to synthetic speech, and the lips and mouth were therefore in the "at rest" configuration. In FIG. 6B, points 157b–159b are the same points as 157a–159a of FIG. 6A, as they are positioned in the "F" phoneme. In FIG. 6C, points 157c–159c are the same points as 157a–159a of FIG. 6A, as they are positioned in the "RR" phoneme. The configuration of the points is hypothetical and applies to the explanation of FIGS. 6A–6C and 7A–7C only. Examples of actual visemes can be found in FIG. 1.

A typical length of time for the face generator to generate a face configuration is 30 milliseconds. However, in the examples that follow, the times for the face generator to generate a face configuration range from 28 to 117 milliseconds, thereby indicating that the process of FIG. 4 is not dependent on generating face configurations at precise and even intervals.

Referring again to the process of FIG. 4, the time line of FIG. 5, and the points of FIGS. 6A–6C, the face generator 40 begins receiving a string of phonemes and time intervals from the text-to-speech converter 14 (step 114 of FIG. 4). The synchronizer 46 reads the time on the timer 30 (step 114), which in this case is zero. The face generator then determines (step 115) an appropriate facial configuration. Since no phoneme is being processed at time zero, the appropriate facial configuration is an "at rest" configuration, and the face generator therefore causes the "at rest" configuration shown in FIG. 6A to appear on the video device 62.

After the face generator generates the "at rest" position, it repeats steps 114–117. Assuming that steps 114–117 take a typical time of 30 milliseconds and because the timer started from time zero, the time on the timer will be 30 milliseconds. Referring to the time line of FIG. 5, at 30 milliseconds, the "F" phoneme is being audibilized. In one embodiment of the invention, the execution of steps 114–117 would generate on the video device the viseme corresponding to the "F" phoneme, thus causing the configuration of FIG. 6B to appear on the video device.

A next repetition of step 114 could result in a reading of 62 milliseconds. Referring to the time line of FIG. 5, at 62 milliseconds, the "F" phoneme has completed and the "RR" phoneme is being audibilized. Therefore, the execution of steps 115–117 would result in the viseme corresponding to the "RR" phoneme to be generated, thus resulting in the configuration of FIG. 6C to be displayed on the video device. Similarly, for the next repetitions of steps 114–117, at, for example, intervals of 28, 37, and 32 milliseconds thus resulting in elapsed times of 88, 125, and 147 milliseconds respectively, the "RR" phoneme is still being audibilized, so the viseme corresponding to the "RR" phoneme would continue to be displayed on the video device.

Another embodiment of the invention provides greater realism by generating interpolated facial configurations. As with the prior example, the first repetition of steps 114–117 would result in the "at rest" configuration being displayed on the video device. However, with the repetition of steps 114–117 at 30 milliseconds, the time line of FIG. 5 indicates that an elapsed time of 30 milliseconds falls between time zero (at which no sound was being audibilized) and 58 milliseconds (the completion of the audibilizing of the "F" phoneme). Therefore, the face generator generates a face configuration as shown in FIG. 7A. In FIG. 7A point 157d is at a position between point 157a (of FIG. 6A, the "at rest" configuration) and point 157b (of FIG. 6B, the configuration for the "F" viseme).

The next repetition of steps 114–117, at an elapsed time of 62 milliseconds would fall 4 milliseconds after the completion of the audibilizing of the "F" phoneme and before the completion of the "RR" phoneme. Therefore, the face generator generates a face configuration as shown in FIG. 7B. In FIG. 7B point 157e is at a position between point 157b (of FIG. 6B, the configuration for the "RR" viseme) and point 157c (of FIG. 6C, the configuration for the "RR" viseme).

Similarly, the repetition of steps 114–117 at elapsed times of 88, 125, and 147 milliseconds would fall after the completion of the audiblizing of the "F" phoneme and before the completion of the "RR" phoneme. The points of the face configurations would be between the corresponding points of the "F" viseme and the "RR" viseme, in each case being close to the point as in the "RR" viseme and farther from the "F" viseme. For example, in FIG. 7C, points 157f, 158f, and 159f are closer to points 157c, 158c, and 159c (the corresponding points of the "RR" viseme) than they are to points 157b, 158b, and 159b (the corresponding points of the "F" viseme).

If, after the generation of the face configuration at an elapsed time 30 milliseconds, some event causes the face generator to be unable to generate a face configuration for, as example, 117 milliseconds, resulting in an elapsed time of 147 milliseconds, the configuration of FIG. 7A would remain on the video device while the phonemes continue to be audibilized, and the audio and video portions of the synthetic speech would be unsynchronized. However, if the face generator is able to generate a configuration at 147 milliseconds, the face generator would generate the configuration of FIG. 7C, thus adaptively resynchronizing the displayed facial image with the audible speech.

While specific implementations of the invention have been described, those familiar with the art will appreciate that the invention may be practiced in other ways while still remaining within the scope and spirit of the appended claims.

We claim:

1. A computer implemented method for displaying a moving image having corresponding sound, comprising the steps of:

transforming elemental sound units to audio signals while maintaining an elapsed time of the transforming;

measuring, while transforming, a current elapsed time to identify an elemental sound unit currently being transformed to audio signals;

identifying an elemental image unit corresponding to the elemental sound unit currently being transformed while transforming the elemental sound units to audio signals; and displaying an image corresponding to the elemental image unit to dynamically synchronize the moving image and the corresponding sound while transforming the elemental sound units to audio signals.

2. The method of claim 1, further comprising the step of:

converting text input to the elemental sound units.

3. The method of claim 1, further comprising the steps of:

associating an amount of time with transforming each elemental sound unit to audio signals;

arranging the amount of time for each transformation in an order corresponding to the order the elemental sound units are being transformed, such order of arranged amounts of time representing a succession of time intervals wherein each time interval corresponds to one of the amounts of time to transform the associated elemental sound unit to audio signals; and wherein the step of measuring a current elapsed time includes the steps of:

using the current elapsed time to identify one of the time intervals as the current time interval; and identifying the elemental sound unit associated with the current time interval as the elemental sound unit currently being transformed.

4. The method of claim 1, further comprising the step of:

repeating the steps of measuring, identifying and displaying at intervals during the transforming of the elemental sound units to audio signals.

5. The method of claim 4, wherein the duration of each interval corresponds to an amount of time used to display the image corresponding to the elemental image unit.

6. The method of claim 1, wherein the step of displaying includes a step of interpolating which forms the displayed image from a previously displayed image and the elemental image unit corresponding to the elemental sound unit currently being transformed.

7. The method of claim 6, wherein the step of interpolating includes a step of determining an elapsed time associated with transforming the elemental sound unit currently being transformed and wherein the displayed image differs from the previously displayed image in proportion to the elapsed time associated with transforming the elemental sound unit currently being transformed.

8. The method of claim 7 wherein the displayed image differs from the previously displayed image in proportion to a trigonometric function of the elapsed time associated with transforming the elemental sound unit currently being transformed.

9. The method of claim 7 wherein the displayed image differs from the previously displayed image in proportion to a Hookean elastic force constant.

10. The method of claim 1, wherein each elemental image unit is a facial configuration including a lip with a shape, and wherein the step of displaying the image includes a step of retrieving data representing the shape of the lip corresponding to the elemental sound unit currently being transformed.

11. The method of claim 10, wherein a database maintains associations between elemental sound units and shapes of lips and wherein the step of retrieving data representing the shape of the lip corresponding to the elemental sound unit currently being transformed retrieves the data from the database.

12. The method of claim 1 wherein the elemental sound units are phonemes and wherein the step of transforming continuously transforms the phonemes at a rate effective to produce continuous speech.

13. A computer implemented method for displaying images having corresponding sounds, comprising the steps of:

transforming elemental sound units to sound while maintaining an elapsed time of the transforming;

measuring, at intervals while transforming, a current elapsed time to identify elemental image units corresponding to elemental sound units currently being transformed to sound; and transforming the identified elemental image units to images to dynamically synchronize the images and the corresponding sounds while transforming the corresponding elemental sound units to sound.

14. An apparatus for displaying a moving image having corresponding sound, comprising:

an audio server transforming elemental sound units to audio signals;

a timer, coupled to the audio server, maintaining an elapsed time of transforming the elemental sound units to audio signals; and an image generator, coupled to the timer, measuring the elapsed time to identify the elemental sound unit currently being transformed, identifying an elemental image unit corresponding to the elemental sound unit currently being transformed and generating for display an image corresponding to the elemental image unit to dynamically synchronize the moving image and the corresponding sound while the audio server is transforming the elemental sound units to audio signals.

15. The apparatus according to claim 14, wherein the image generator includes a synchronizer for reading the elapsed time on the timer.

16. The apparatus according to claim 14, further comprising:

a synchronizer coupled to the timer and the image generator for reading the elapsed time on the timer and transmitting the elapsed time to the image generator.

17. The apparatus according to claim 14, further comprising:

a converter converting text input to a series of elemental sound units.

18. The apparatus according to claim 14, wherein the image generator includes an image calculator for determining an elapsed time associated with transforming the elemental sound unit currently being transformed and for interpolating the generated image from a previously generated image and the elemental image unit corresponding to the elemental sound unit currently being transformed in proportion to the determined elapsed time.

19. The apparatus according to claim 18 wherein the generated image differs from the previously displayed image in proportion to a trigonometric function of the elapsed time associated with transforming the elemental sound unit currently being transformed.

20. The apparatus according to claim 18 wherein the generated image differs from the previously displayed image in proportion to a Hookean elastic force constant.

21. The apparatus according to claim 14 wherein the generated image is a particular facial configuration; and further comprising:

a database containing data representing associations between elemental sound units and facial configurations; and means for retrieving from the database data representing the particular facial configuration.

* * * * *